United States Patent [19]

Rasenberger

[11] 3,737,001
[45] June 5, 1973

[54] TRACK ASSEMBLY FOR CONVERTING WHEELED VEHICLES

[76] Inventor: Rudolf Rasenberger, Rheinfelder Strasse 19, Grenzach, Germany

[22] Filed: May 28, 1971

[21] Appl. No.: 147,783

[30] Foreign Application Priority Data

May 29, 1970 Germany..................P 20 26 295.7

[52] U.S. Cl.................180/5 A, 180/9.2 R, 180/9.54
[51] Int. Cl......................B62d 55/04, B62m 27/02
[58] Field of Search....................180/5 A, 9.38, 9.5, 180/9.2 R, 9.2 CD; 305/29

[56] References Cited

UNITED STATES PATENTS

| | | | |
|---|---|---|---|
| 1,292,427 | 1/1919 | Brekken | 180/5 A |
| 2,852,317 | 9/1958 | Riemerschmid | 180/9.2 C |
| 3,163,249 | 12/1964 | Ledohowski | 180/9.2 R |
| 3,590,935 | 7/1971 | Celia | 305/29 |

FOREIGN PATENTS OR APPLICATIONS 263,532  11/1911  Germany..............................180/5 A Primary Examiner—Richard J. Johnson
Attorney—Michael S. Striker

[57] ABSTRACT

A track assembly for converting a normally wheeled motor vehicle having a plurality of wheel mounts at least one of which is driven, into a track-laying vehicle. Support means of the track assembly has mounted thereon wheel means including ground wheels and drive wheels. Tracks are trained about the wheels and engage with the drive wheels so as to be driven by the same, and coupling means can be bolted or otherwise secured to the driven wheel mount or wheel mounts of the vehicle and is connected in motion-transmitting relationship with the drive wheels of the track assembly so as to transmit motion to the latter.

18 Claims, 8 Drawing Figures

Patented June 5, 1973

INVENTOR:
RUDOLF RASENBERG

Patented June 5, 1973 3,737,001

INVENTOR:
RUDOLF RASENBERGER

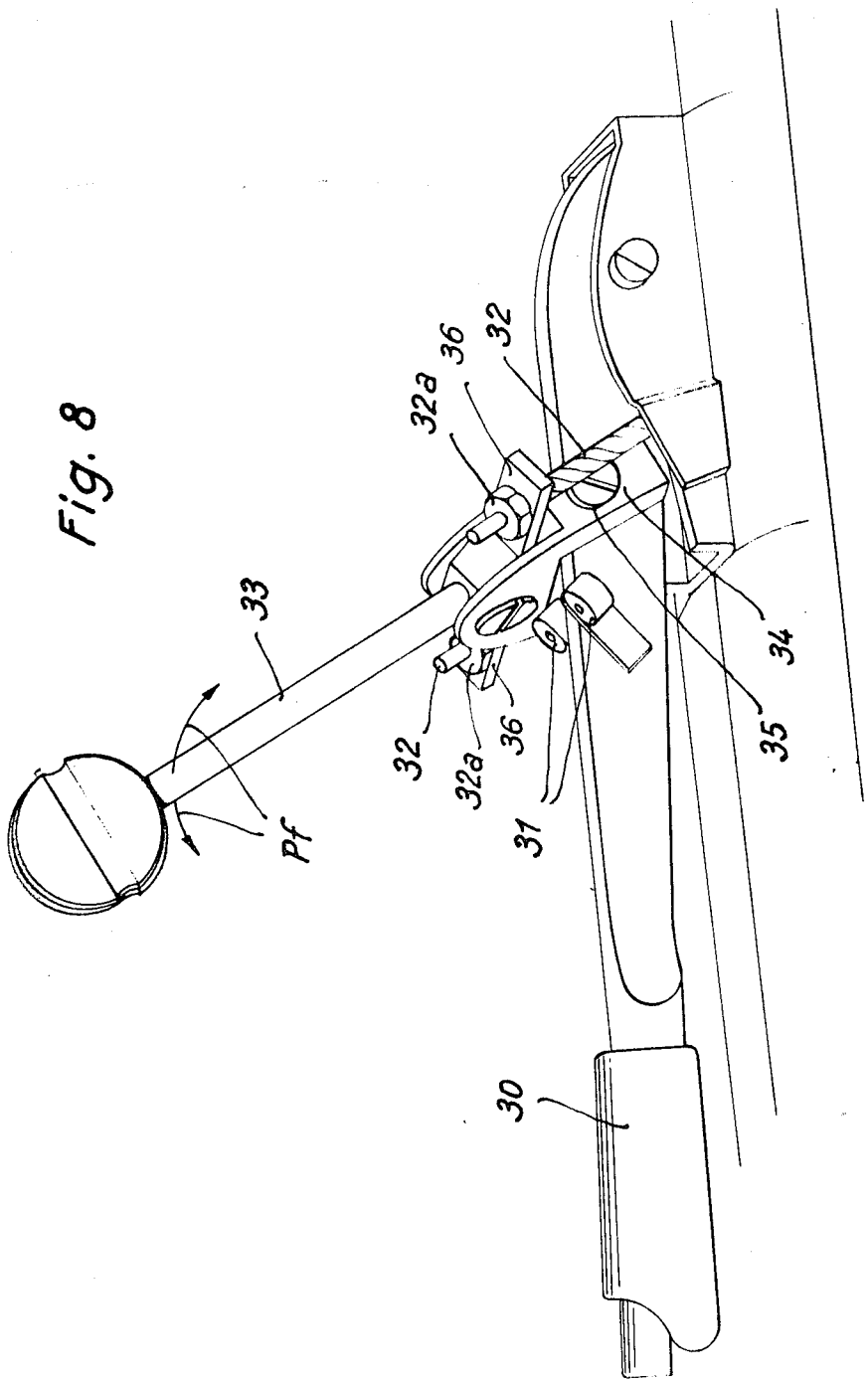

TRACK ASSEMBLY FOR CONVERTING WHEELED VEHICLES

BACKGROUND OF THE INVENTION

The present invention relates generally to track assemblies, and more particularly to a track assembly for converting a normally wheeled motor vehicle having a plurality of wheel mounts at least one of which is driven, into a track-laying vehicle.

It is already known to provide converting assemblies which are capable of converting a wheeled vehicle into a track-laying vehicle. In particular, this is known for making a wheeled vehicle suitable for traversing snowy terrain. However, it is difficult in the constructions known from the prior art, to effect a change-over from wheeled mode of locomotion to a track-laying mode. Aside from this, the prior-art constructions of such converting assemblies require that the assembly is usually to be accommodated in the wheel well or wells of the vehicle, which means that the available space is substantially limited and, concomitantly, the maximum possible width of the track of such an assembly is similarly limited.

SUMMARY OF THE INVENTION

It is, accordingly, an object of the present invention to provide a track assembly of the type under discussion which is not possessed of the aforementioned disadvantages.

More particularly it is an object of the present invention to provide a track assembly for converting a normally wheeled motor vehicle into a track-laying vehicle, and more particularly an assembly which makes this possible rapidly and with a minimum of difficulty, and furthermore without requiring the necessity for carrying out any substantial changes on the vehicle itself.

Still a further object of the invention is to provide such a track assembly which permits rapid and simple re-conversion of the vehicle to an all-wheeled mode.

It is still an additional object of the invention to provide such a track assembly which can utilize rather wide tracks in order to improve the efficiency of the assembly in various types of terrain. In particular, the track assembly is to make the vehicle which it converts from a wheeled into a track-laying mode of locomotion, suitable for preparing skiing runs and the like. In pursuance of the above objects, and of others which will become apparent hereafter, one feature of the invention resides in a track assembly for converting a normally wheeled motor vehicle having a plurality of wheel mounts at least one of which is driven, into a track-laying vehicle. The assembly comprises support means, wheel means mounted on the support means and including drive wheel means, and track means trained about the wheel means and engaging with the drive wheel means so as to be driven by the same. Furthermore, the assembly comprises coupling means carried by the support means connected with the drive wheel means in motion-transmitting relationship, and this coupling means is adapted to be connected with the one wheel mount of the motor vehicle in motion-receiving relationship.

In a motor vehicle it is actually the brake drum, on which the wheel is mounted, which constitutes the wheel hub of a wheel. By removing the wheel or wheels which are to be replaced by the novel track assembly, the coupling means can be connected with the brake drum or drums in releasable relationship, and inasmuch as these drum or drums rotate if they are on the driven axle of the vehicle, motion can be transmitted in this manner to the drive wheel means of the track assembly and from there to the track means thereof. This is of course the simplest manner of coupling the track assembly with the motor vehicle which is to be converted. The remaining wheels of the vehicle may remain in place, and this mode of conversion is not only rather quick and reliable, but also it requires in effect no changes on the motor vehicle itself, so that the conversion can be carried out not only rapidly but also inexpensively.

It is advantageous if the coupling means is constructed as a drive or coupling disc and is located, at least in its operative position, above the level of the wheels of the track assembly, the wheels including the road wheels and the drive wheels and idler wheels conventional for track assemblies. Suitable motion-transmitting means, for instance a drive chain arrangement or the like, may transmit motion from the coupling disc to the drive wheel or wheels of the track assembly, and the coupling disc itself or discs may be provided with holes or the like for connection with the brake drum of the motor vehicle. In fact, a plurality of such connecting means, in form of apertures or the like, may be provided on the coupling disc so that depending upon the type of brake drum or type of vehicle involved, different ones of these apertures may be utilized for effecting the necessary connection. It need not be emphasized that different vehicles have different numbers and differently arranged apertures on the brake drum for connecting purposes, or pins, bolts or the like which are arranged differently and provided in different numbers.

It is advantageous if the track assembly has a frame which constitutes the support means and if in turn the frame is provided with at least one extension portion which extends under the chassis of the vehicle being converted and is provided with an abutment, preferably a spring-elastic abutment, which engages the chassis and serves to limit relative movements which can be performed by the vehicle with reference to the track assembly, and vice versa. The dimensioning of the projecting portion and the size of the abutment surface can be so selected that in operative position the abutment engages an engaging portion which on many vehicles (for instance on the Volkswagen) is provided on the chassis routinely for engagement of the vehicle jack. In many types of vehicles where such jack engaging portions are routinely provided, they are located slightly forwardly of the driven rear wheels of the vehicle and the abutment provided for this purpose on the track assembly can readily be made to reach to such engaging portion. In particular, it is possible to make the projecting portion and/or the abutment adjustable so as to accommodate them readily to different types of vehicles. The purpose is, of course, to suppress or at least reduce undesired relative movements between the track assembly and the vehicle in a simple but yet reliable and effective manner.

It is also desirable, although not necessary, to provide additional engaging portions which are releasably interposed between the track assembly and the vehicle. Particularly if the vehicle is of the type having jointed cross-shaft axles, it may be desirable and necessary—in order to reduce the possibility of changes in the track width of the track assembly and to eliminate canting of the tracks of the assembly with reference to one another—to limit the spring movement of such an axle to the maximum possible extent. For this purpose it is desirable to provide the track assembly with at least one preferably elastically yieldably mounted supporting element which can be connected with connectors provided on the vehicle chassis for anchoring purposes, namely for anchoring certain structural components such as the transmission, a trailer hitch or the like. This is particularly advantageous where the vehicle is a passenger car having a rear engine and rear wheel drive. To limit the movement of a cross-shaft jointed axle it is desirable to provide at least one arm which extends transversely of the direction of movement of the vehicle and can be releasably connected with the track assembly, and further releasably connected with the vehicle by means of a flange or the like, again for instance at the suspension for the transmission or at an additional provided connecting portion. This transverse arm may advantageously engage the track assembly at opposite lateral sides thereof and of the vehicle,- whereby the track width of the track assembly is fixed to a constant value in a simple and reliable manner. The length of this crossarm or transverse arm can be made adjustable, for instance by means of a thread and a cooperating internally threaded sleeve, with the arm then being composed of two relatively movable sections. Such an arrangement has the advantage that it permits an adjustment for different loads carried by the vehicle as well as an adjustment for different types of vehicles. The connection of the cross arm at the vehicle as well as at the track assembly may be made elastically yieldably by the interposition of elastically yieldable components.

It is sufficient with the above embodiment to secure on the vehicle a supporting plate or the like to which a flange of the cross arm can be releasably connected. If such a supporting plate is provided on the vehicle, and it may for instance resemble a mounting plate for a trailer hitch or the like, then the vehicle may be provided in a simple manner with the track assembly, that is it may be connected therewith in a simple manner and the cross arm can be similarly simply connected with the vehicle in order to prevent the undesired movements of the jointed cross-shaft axle.

According to a further embodiment of the invention the track assembly may have a length which is at least equal to the distance between the front and rear axles of the vehicle, and additional supporting elements may be provided which are connected with the vehicle in the region of the front axle thereof, preferably with the brake drums of the non-driven front wheels which are then removed. The brakes at the two vehicle sides, which may for instance be mechanically operated by the handbrake, may then be provided with a simple auxiliary device which permits them to be operated independently, that is to operate the brakes at one side but not at the other, or vice versa. In this manner the movement of the tracks at one side of the vehicle may be braked independently of the movement of the tracks at the other side, so that steering of the vehicle is made very simple. In other words, when the track at one side is braked, the vehicle will perform a movement through a curve which moves in the direction toward the brake side. Especially if in such an embodiment the vehicle has jointed cross-shaft axles, the aforementioned cross arm may be advantageously provided because the jointed cross-shaft axles permit angular inclinations between the front and rear axles which would have to be absorbed by deformation of the track assembly extending from the front to the rear axle, an undesirable requirement. By providing the cross arm or arms, this necessity is avoided.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 8 is a diagrammatic fragmentary detail view, on an enlarged scale, of an additional embodiment of the invention.

DESCRIPTION OF THE PREFERRED EMBODIMENTS

Figure 2:
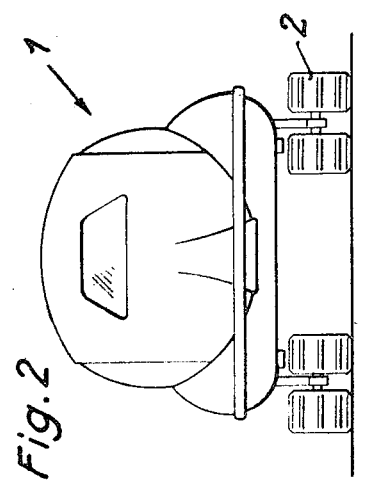
FIG. 2 is a rear elevation of FIG. 1.

Discussing now the drawing in detail, and firstly the embodiment illustrated in FIGS. 1, 2 and 5—7, it will be seen that a motor vehicle (here illustrated as a Volkswagen) is identified in toto with reference numeral 1. It is known that a Volkswagen has rearwheel drive, that is the rear axle and rear wheels are driven. In the illustrated embodiment the rear wheels of the vehicle 1 have been replaced with a track assembly 2 according to the present invention.

Figure 1:
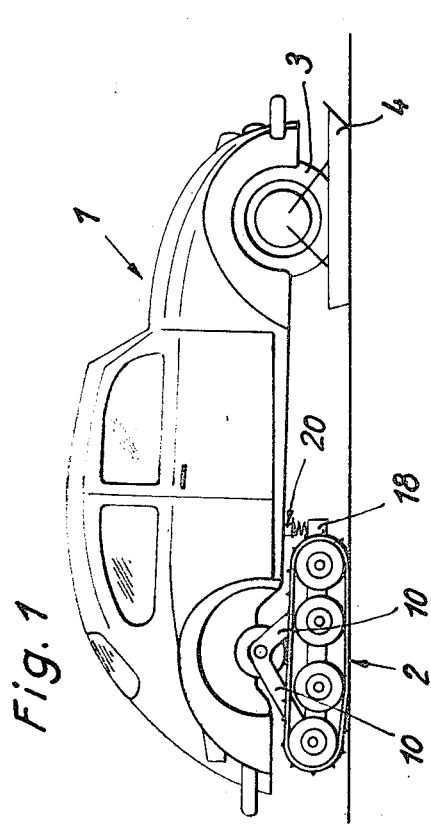
FIG. 1 is a somewhat diagrmmatic side-elevational view of a vehicle provided with a track assembly according to one embodiment of the invention.

As a comparison of FIGS. 1 and 2 shows clearly, the track assembly utilizes two sections each provided in lieu of one of the rear wheels of the vehicle. The front wheels 3 of the vehicle, which are the steering wheels, are left in place but are provided with runners or skids 4 which in the illustrated embodiment are slightly dished so that the wheels 3 can be placed into them as illustrated. The wheels 3 may be suitably connected with the runners 4, as shown diagrammatically, and the purpose of the runners 4 is primarily to further facilitate the free operability of the vehicle 1 in snowy terrain. In particular, the runners 4 already tend to depress and compact the snow, making it that much easier for the following tracks of the track assembly 2.

Figure 5:
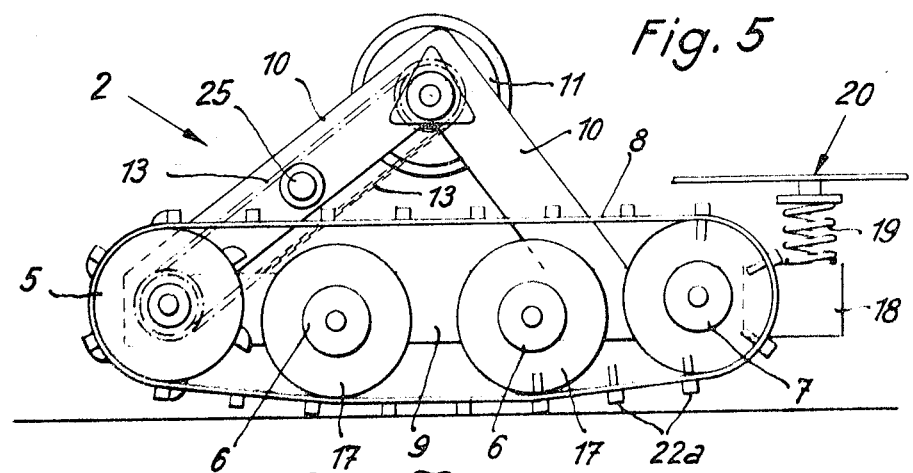
FIG. 5 is a side-elevational somewhat diagrammatic detail view of the track assembly in FIGS. 1 and 2.
Figure 6:
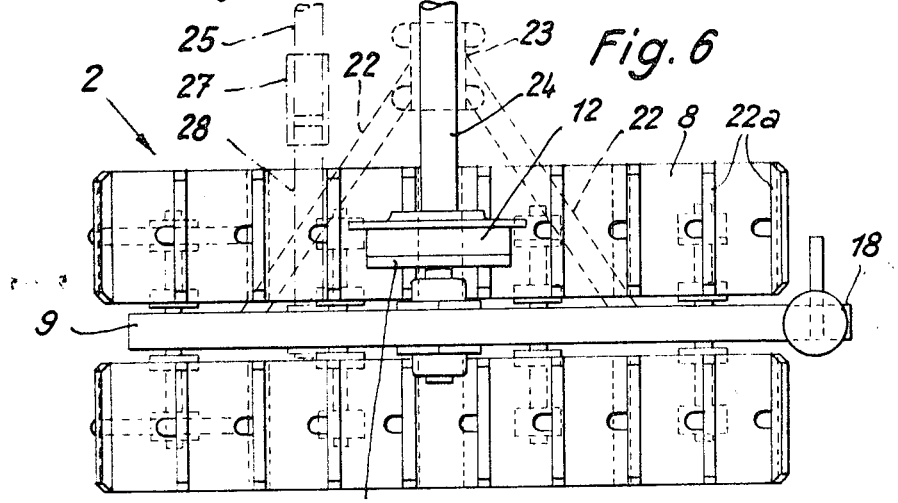
FIG. 6 is a fragmentary top-plan view of FIG. 5.
Figure 7:
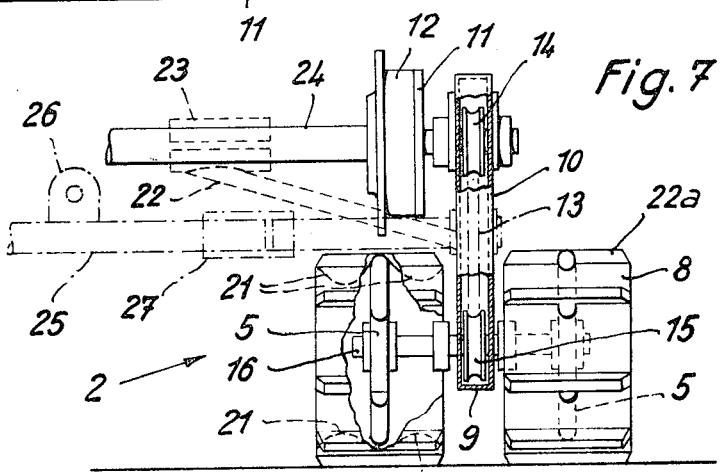
FIG. 7 is a fragmentary end-elevational view of FIG. 6.

FIGS. 5–7 illustrate details of the track assembly 2, it being understood that only a single section is illustrated and that the non-illustrated second section is identical but symmetrical with reference to the one that has been shown. Each of the sections is connected with the brake drum of one of the rear wheels of the vehicle 1.

As shown in FIGS. 5–7, each of the sections of the track assembly 2 comprises a drive wheel or sprocket 5, a plurality of road wheels 6 and an idler wheel 7. Trained about these wheels is a track 8 which advantageously is of elastomeric material provided at the outer side facing the ground with transversely extending cleats 22a. Each section of the track assembly 2 is provided with a support means in form of a frame 9 or the like which may consist of four tubular members of Quadratic or other cross-section. Furthermore, each of the sections of the track assembly 2 carries two of the tracks 8 (compare FIGS. 6 and 7) which are transversely spaced from one another with the frame 9 being located between them. Suitable journalling means are provided for supporting the wheels 5, 6 and 7, and supporting arms 10 extend intermediate the tracks 8 upwardly and support a coupling means in form of a drive disc 11 located at a level above the tracks 8 and the wheels 5, 6 and 7.

The drive disc 11 braces the respective section of the track assembly 2 with reference to the vehicle 1 which has been omitted in FIGS. 5–7 for the sake of clarity except for the brake drum 12 at one side. When a vehicle 1 is to be converted to a track-laying vehicle, the wheels are removed from the brake drums of the driven axle, here the rear axle, and the drive disc 11 of the respective assembly section is secured to the brake drum 12 in known manner, that is in the same manner in which the wheel would normally be secured thereto. It should be understood that the term brake drum as used herein is intended to designate any wheel mount irrespective of whether it is actually a brake drum or not, such as a wheel disc or the like, as long as it serves to mount one of the wheels when the vehicle is in a wheeled operating mode. The drive disc 11 is provided with non-illustrated apertures or the like by means of which it can be connected with the brake drum 12 in the same manner in which a wheel would normally be secured thereto. As pointed out before, a plurality of such apertures or the like may be provided on the drive disc 11 so that the latter can be connected with a brake drum 12 irrespective of the particular type of vehicle involved, that is selective ones of the apertures will be utilized in any given instance, depending upon the number and distribution of the corresponding apertures or bolts on the particular brake drum. This means that the drive disc 11 can be used with different types of brake drums and, accordingly, with different types of vehicles.

The drive disc 11 is journalled floatingly in the region where the upwardly inclined (in triangular manner) arms 10 are connected with one another, with their lower ends of course being connected with the frame 9. Coaxial to the drive disc 11 there is further provided in this region a chain sprocket 14 which is mounted so as to be rotatable together with the drive disc 11, and about which a drive chain is trained in the illustrated embodiment, identified with reference numeral 13 and also being trained about a further chain sprocket 15 which is mounted on a shaft 16 of the track assembly 2. The shaft 16 is in turn fast with the drive wheels 5 of the two tracks 8 of the illustrated section of the track assembly, with the same arrangement being of course provided as for the other non-illustrated section of the assembly 2.

With this embodiment the tracks of each section, and accordingly all four tracks of the track assembly 2, are located below the wheel well of the vehicle 1 so that no dimensional limitations are imposed on them by the physical configurations of the wheel well. Moreover, this of course makes it possible for the tracks to extend underneath the vehicle which would not otherwise be possible, a possibility which is further facilitated by sufficient lengths of the arms 10. With such a construction both the length and the width of the tracks 8, and of the overall track assembly 2, can be made sufficiently large to make a converted vehicle suitable for travel in all types of terrain. Nevertheless, with this embodiment the track assembly can be readily assembled and disassembled with respect to the vehicle, by a simple exchange of the track assembly 2 against the driven wheels of the vehicle.

As FIG. 5 shows, the arms 10 may at least in part be hollow so that the drive chain 13 may be totally or partly accommodated in the respective arms. The road wheels 6 or supporting wheels are provided in the illustrated embodiment with an elastically yieldable periphery 17, for instance conventional air-filled tires, in order to provide better accommodation to unevenness of the ground.

Each frame is provided with at least one extension portion 18 which extends beneath the chassis of the vehicle 1 and carries at least one abutment 19, here illustrated in the preferred manner as spring-elastic. The projecting portion 18 and/or the abutment 19 may be made adjustable if desired in well-known manner, and in the operative position thereof it extends to and engages with an engaging portion 20 provided on the vehicle in routine manner (not a part of the invention) for engagement with a vehicle jack. In this way, relative movements between vehicle 1 and the track assembly 2 are limited if not suppressed. Of course, the chassis of the vehicle will ordinarily be strong enough to cooperate with the abutment 19 in this manner. The engaging portions 20 are usually or frequently located forwardly of but adjacent the rear wheels of a rear-wheel drive vehicle, so that proper engagement of the abutment 19 with the engaging portion 20 will usually take place even in different types of vehicles, especially if the abutment 19 has a sufficiently large contact surface and/or is made adjustable.

The idler wheels 7 may be made displaceable in longitudinal direction of the tracks 8, so that the tracks may be tensioned, and this is well known from tracked vehicles and requires no further explanation. The idler wheels 7 and the drive wheels 5 may be guided at opposite lateral sides in the tracks 8, which is illustrated for instance in the left-hand track 8 of FIG. 7 where abutment portions 21 at the inner side of the track provide lateral guidance at opposite sides of the drive wheel 5. Of course, the drive wheel 5 is provided with teeth or sprockets in conventional manner which cooperate with the track 8 to advance the latter.

FIGS. 6 and 7 also show in broken lines additional reinforcement elements 22 which extend underneath the vehicle 1 in upward inclination. These additional reinforcement portions 22 may be provided, as illustrated, but they can be omitted. If they are provided, then they are secured releasably by means of a clamp 23 or the like, preferably with an internal elastically yieldably lining (rubber or the like), or with a different releasable means, which engages a tube 23 surrounding the non-illustrated driven axle. The portions 22 are connected with the members 10 somewhat above the tracks 8 and provide in a simple and reliable manner a stiffening and bracing of the sections of the track assembly in longitudinal and transverse direction. In this manner the complexity of connecting and disconnecting the track assembly from the vehicle 1 is increased only very slightly, especially due to the simple manner of connecting and disconnecting the portions 22 from the tube 24, whereas on the other hand the connection between the vehicle and track assembly is substantially improved. Especially if the vehicle 1 with the track assembly 2 is used for work rather than purely for pleasure, for instance for repairing ski runs by compressing the snow thereon, and where substantial inclinations are frequently present significant forces being required to be transmitted, such an embodiment is highly advantageous. In this connection it is also pointed out that the smaller diameter of the drive wheels 5 with respect to the original vehicle wheels (compare for instance the front wheels 3 with the drive wheel 5 in FIG. 1) provides for a greater step-down ratio between the vehicle drive and the track assembly, which is advantageous and which can be further varied, if desired, by appropriately configurated and constructed chain sprockets or the like. If an elastically yieldable lining is provided in the component 23, small relative movements between the tube 24 and the portions 22 can be readily absorbed.

Especially if the driven wheels of the vehicle are mounted on a jointed cross-shaft axle, it is further advantageous to utilize the expedient illustrated in chain lines in FIGS. 6 and 7. This can be utilized in combination with the other possibilities illustrated in FIGS. 6 and 7, or it can be utilized for instance without the portions 22. As shown in FIGS. 6 and 7 there is provided at least one additional, preferably elastically mounted bracing member which may for instance be configurated as a tube or the like, and which can be connected to suitable anchoring portions of the vehicle chassis, for instance the connection for a trailer hitch, for the transmission or the like. The purpose is to limit pivotal movements of the axis, and in the illustrated embodiment the additional bracing element is in the form of a support 25, for instance a transversely extending tube, which extends transversely of the direction of movement of the vehicle and is connected to the track assembly 2. By means of a flange 26 or the like it can be connected to the vehicle 1 as mentioned above, and as shown in FIG. 7. Advantageously the member 25 is connected with the frames 9 at opposite sides of the vehicle, that is with the two sections of the track assembly, and FIG. 7 illustrates this by having the arm 25 extend beyond both lateral sides of the flange 26. It is advantageous if the length of the arm 24 is adjustable, for instance by means of a thread provided on one section of the arm and an internally threaded sleeve 27 provided on a second section of the arm. This makes it possible to adjust the space between the two sections of the assembly 2 with reference to one another, in accommodation to the load acting upon the vehicle at any time. The portion of the arm 25 which extends to the respective frame 9 can be configurated as a threaded bolt 28 or the like onto which the sleeve 27 is threaded. With this arrangement pendulum or pivotal movements of a jointed cross-shaft axle can be largely suppressed whereby the track width of the track assembly remains constant at all times for all intents and purposes. This possibility is particularly important because a great many vehicles are provided with rear engines and with jointed cross-shaft axles. In fact, this possibility is especially advantageous not only when the axle is a jointed cross-shaft axle but when at the same time the engine of the vehicle is a rear engine, because the weight of the rear engine affords a particularly good ground contact for the tracks of the track assembly. Elastic intermediate components or cushions may be provided at the connection of the arm 25 to the vehicle 1 as well as to the sections of the track assembly 2, to provide for absorbing of minor relative movements between these elements.

The frame 9 may also be composed of three quadratic tubes, or of tubes which are of different cross-sectional configuration, and the axes for the road wheels 6 are provided at the lower portion of the frame 9.

Figure 4:
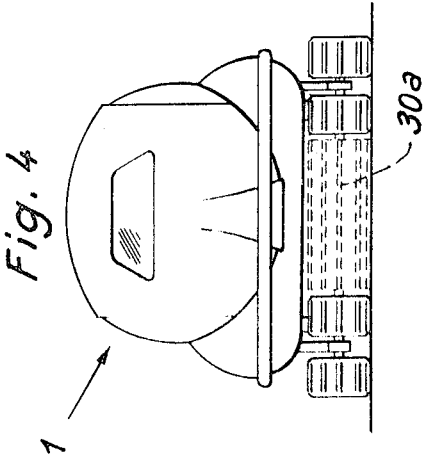
FIG. 4 is an end-elevational view of FIG. 3.
Figure 3:
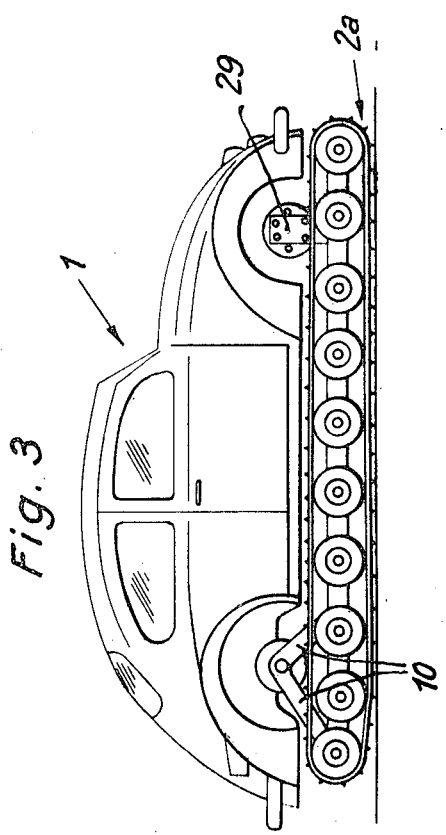
FIG. 3 is a view similar to FIG. 1 but illustrating a further embodiment of the invention.

FIGS. 3 and 4 illustrate a further embodiment in which the track assembly 2a has a length which corresponds at least to the distance between the front and rear axle of the vehicle. In this embodiment there are provided additional supporting elements 29 which connect the track assembly 2a with the wheel mounts of the non-driven wheels, in the illustrated embodiment of the front wheels of the vehicle. In this embodiment also the brakes which are mechanically operated, that is for instance the handbrakes, may be independently operable for both sides of the vehicle. The purpose here is to guide the vehicle, analogously to the manner in which a full-track vehicle is guided such as a military tank, by retarding via the brake operating at one side of the vehicle one of the tracks of the track assembly, so that the vehicle then slews about this one track towards the side at which the brake is operated. This is well possible because via the differential gear of the vehicle the drive of the track at the other side of the vehicle continues without interruption and without braking.

FIG. 8 illustrates a simple additional component which can be combined with the handbrake of the vehicle to make such independent operation of the brakes at opposite sides of the vehicle possible. As illustrated, the normal lever 30 of the vehicle handbrake is provided with eyes 31 to which normally the Bowden linkages 32 of the handbrake are connected. When the lever 30 is raised upwardly, the Bowden linkages are simultaneously tensioned and then the brakes at both sides of the vehicle are simultaneously operated. Conventionally it is the brakes for the rear wheels which are operated via the handbrake lever 30.

In accordance with the invention there is provided a control lever 33 which is connected to the lever 30 in the region of the eyes 31, via a bifurcated element 34. The connection may be effected by clamping, by screwing or the like, and in FIG. 2 a screw 35 is provided which may either penetrate the lever 30 or may clamp the member 34 to the lever 30. Located above the point of connection established via the screw 35, the lever 33 carries two arms 36 which are movable with it and by means of nuts 32a the Bowden linages 32 are connected to the respective arms 36 instead of to the eyes 31 as was previously the case. The control lever 33 is mounted in the bifurcated member 34 by means of a screw, bolt or similar connector 33 so as to be pivotable in the direction of the double-headed arrow PF transversely of the direction in which the arm or lever 30 can be raised or lowered.

So modified as illustrated in FIG. 8, raising of the normal handbrake lever 30 moves the bifurcated member 34 with it, whereby the Bowden linkages 32 are simultaneously tensioned as before. Thus, the brakes at both sides of the vehicle are simultaneously operated. If, however, the lever 30 is left in the position illustrated in FIG. 8 and it is desired to operate the brakes of only one side of the vehicle, then the control lever 33 is pivoted in the direction of the arrow PF, and by moving it in one lateral direction the brakes at the opposite side will be operated by tensioning of the associated Bowden linkage 32. This means that the tracks at the side whose brakes are operated, will be retarded so that the vehicle (whose tracks at the other side continue to be driven uninterruptedly) will slew about the retarded track and will drive in a curve which has the retarded track as its pivot. Such an embodiment of course greatly facilitates the maneuverability of the vehicle in difficult terrain, in the same manner in which this is known from full-track vehicles, for instance from track-laying tractors or from track-laying military vehicles.

The embodiment in FIG. 8 is primarily intended for use with the embodiment in FIGS. 3 and 4, but it will be understood that it can also be used with the embodiment of FIGS. 1 and 2 if desired, and that in this case, it will further include the maneuverability of the embodiment of FIGS. 1 and 2 also.

The embodiment in FIG. 8 is very simple and can be readily incorporated in an existing vehicle at the existing handbrake, without thereby in any way detracting from the normal operation of the handbrake when it is desired unnecessary to operate the brakes at both sides of the vehicle simultaneously as is the case when the vehicle is in the fully wheeled mode.

Particularly in the embodiment of FIGS. 3 and 4 the transverse arm 25 is advantageous for preventing pendulum movements of the jointed cross-shaft axle, if such is present in the vehicle, because otherwise bending or torsional stresses may occur in the frames 9 of the sections of the track assembly intermediate the front and rear axles of the vehicle.

It will be appreciated that the present invention makes it possible in a simple and advantageous as well as speedy manner, to convert wheeled vehicles, for instance passenger cars or the like, and also delivery vans, small trucks and the like, to a track-laying mode, with the vehicle being capable of being converted either into a half track (FIGS. 1 and 2) or a full track (FIGS. 3 and 4). Thus, wheeled vehicles can be readily converted for use in difficult terrain that cannot normally be negotiated by wheeled vehicles, including snowy or icy terrain.

Thus, the present invention makes it possible for instance to readily convert wheeled vehicles for use as emergency assistance vehicles, for instance in case of such natural catastrophes as snow-slides or the like, as supply vehicles for snowy or rocky terrain, as hunting vehicles in such terrain or as commercially usable vehicles, for instance for preparing and maintaining ski runs or the like. Naturally, the vehicle itself or the track assemblies may be provided with snow rollers or the like which are shown in broken lines in FIG. 4 and identified with reference numeral 30a, for rolling and depressing the snow if the vehicle is used for preparation and/or maintenance of ski runs or the like.

It is evident that, taking merely one possible utilization of the present invention by way of example, the present invention makes it possible to obtain a vehicle for construction and maintenance of ski runs by simple and reliable conversion on a temporary basis of a normally wheeled motor vehicle, thus providing the possibility of using an existing normally wheeled motor vehicle on a temporary basis for carrying out work that would normally have to be carried out by highly expensive and complicated specialty vehicles. Also, of course, the present invention makes it possible for drivers of a normally wheeled motor vehicle to readily convert the same for track-laying use, for instance when weather conditions make this necessary. This is highly advantageous, for example, for persons operating motor vehicles in areas in which in the winter time weather conditions are likely to become so bad as to make it difficult if not impossible to operate a wheeled motor vehicle in the normal manner. Under such circumstances the vehicle can then be readily converted into a track-laying vehicle which can operate where it could not operate before. Especially the embodiment in FIGS. 1 and 2 can be made small and light enough so that it can be carried along on the vehicle itself, for instance on a roof rack provided for this purpose, or in a sufficiently large trunk or in the back of a stationwagon, so that the vehicle can be converted from wheeled to track-laying operation almost anywhere and on very short notice.

The arrangement of the tracks of the assembly beneath the driven axle of the vehicle and below the bottom or floor of the vehicle, makes it possible (as already pointed out earlier) to construct the tracks themselves very wide without having to fear contact of the tracks with any component of the vehicle itself, thereby greatly facilitating the operability of the track assembly. Also, two individual parallel tracks together constitute a section of the track assembly, which means that the wheels for the tracks can be located very close to the actual wheel bearings of the motor vehicle which is advantageous in terms of the load acting on the vehicle axle.

It will be understood that each of the elements described above, or two or more together, may also find a useful application in other types of constructions differing from the types described above.

While the invention has been illustrated and described as embodied in a track assembly for converting a normally wheeled motor vehicle into a track-laying vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A track assembly for converting a normally wheeled motor vehicle having a plurality of wheel mounts at least one of which is driven, into a track-laying vehicle, comprising support means including a support frame and support members connected with said support frame and having at least two support arms extending upwardly from said support frame defining therewith a substantially triangular configuration; wheel means mounted on said support means and including drive means rotatable about an axis; track means comprising two spacedtrack sets each having two transversely spaced endless tracks framed about said wheel means at opposite lateral sides of respective arms of said support members and engaging with said drive wheel means so as to be driven by the same; and coupling means carried by said support means and connected with said drive wheel means in motion-transmitting relationship and adapted to be connected with said one wheel mount in motion-receiving relationship, said coupling means including a coupling disc member mounted on said support arms for rotation in axial parallelism with said drive wheel means.

2. A track assembly as defined in claim 1, said drive wheel means comprising two transversely spaced drive wheels each associated with one of said track sets; further comprising a mounting axle extending transversely from one to the other of said track sets and carrying said two drive wheels; and further comprising motion-transmitting means for transmitting motion between said coupling means and said mounting axle, including a sprocket mounted on said axle intermediate said track sets, and a drive chain trained about said sprocket and cooperating with said coupling means.

3. A track assembly as defined in claim 1, said wheel means including said drive wheel means and road wheel means; and wherein said road wheel means comprise a plurality of road wheels engaging said track means at a side of the latter remote from the ground and being of elastically yieldable material at least in the region of their respective outer peripheries.

4. A track assembly as defined in claim 1 said track means comprising endless loops of elastomeric material having a ground-contacting outer side, and transverse cleats provided on said outer side extending transversely of the direction of movement of said track means.

5. A track assembly as defined in claim 1, said wheel mounts comprising a front wheel mount and a rear wheel mount constituting said driven wheel mount; and further comprising a pair of runners operatively connectable with said front wheel mount.

6. A track assembly as defined in claim 1, said coupling means being mounted on said support means at a level above said track means and said drive wheel means; and further comprising motion-transmitting means connecting said coupling means with said drive wheel means for transmitting to the latter such motion as is imparted to said coupling means by said one wheel mount.

7. A track assembly as defined in claim 6, said motion-transmitting means comprising chain drive means.

8. A track assembly as defined in claim 6; and further comprising connecting means provided on said coupling means for releasably connecting said coupling means with said one wheel mount.

9. A track assembly as defined in claim 1, said support means comprising at least one extension portion adapted to extend underneath the chassis of a vehicle being converted by said track assembly, and abutment means on said extension portion adapted to engage said chassis for limiting relative displacements between the same and said assembly.

10. A track assembly as defined in claim 9, said chassis of said vehicle having an engaging portion normally adapted for engagement with a jack; and said abutment means being configurated for cooperative engagement with said engaging portion.

11. A track assembly as defined in claim 9, said reinforcing element having portions connected with said support means and said chassis, respectively; and further comprising elastically yieldable means interposed between said portions of said support means and chassis, respectively.

12. A track assembly as defined in claim 9, said abutment means comprising spring means.

13. A track assembly as defined in claim 1, said driven wheel mount comprising a drive axle surrounded by a tubular element; and reinforcing members extending from said support means upwardly and inwardly towards said drive axle and carrying a clamping element releasably engageable with said tubular element.

14. A track assembly as defined in claim 13, said clamping element being a clamping sleeve partly surrounding said tubular element and comprising an inner bushing of elastically yieldable material.

15. A track assembly as defined in claim 1, said vehicle having a chassis provided with at least one anchoring portion for structural components; and further comprising at least one reinforcing element provided on said support means and releasably connectable with said anchoring portion of said chassis.

16. A track assembly as defined in claim 15, said reinforcing element comprising at least arm one reinforcing arm extending transversely of the direction of advancement of said track means, and connecting means for releasably connecting said reinforcing arm with said anchoring portion.

17. A track assembly as defined in claim 15, said chassis having opposite lateral sides and said track means being located at the respective lateral sides; and wherein said reinforcing element is connected with said track means in the region of said opposite lateral sides.

18. A track assembly as defined in claim 17, said reinforcing element comprising at least one reinforcing arm, and varying means for varying the length of said reinforcing arm.

* * * * *